(12) United States Patent
Fuller

(10) Patent No.: US 12,554,315 B1
(45) Date of Patent: Feb. 17, 2026

(54) POWER DISTRIBUTION SYSTEM AND METHOD

(71) Applicant: Core Scientific Operating Company, Bellevue, WA (US)

(72) Inventor: Thomas Middleton Rutledge Fuller, Seattle, WA (US)

(73) Assignee: Core Scientific, Inc., Austin, TX (US)

( * ) Notice: Subject to any disclaimer, the term of this patent is extended or adjusted under 35 U.S.C. 154(b) by 293 days.

(21) Appl. No.: 17/737,491

(22) Filed: May 5, 2022

Related U.S. Application Data

(60) Provisional application No. 63/185,714, filed on May 7, 2021.

(51) Int. Cl.
  *G06F 1/3296* (2019.01)
  *G06F 1/3206* (2019.01)

(52) U.S. Cl.
  CPC .......... *G06F 1/3296* (2013.01); *G06F 1/3206* (2013.01)

(58) Field of Classification Search
  CPC .............................. G06F 1/3296; G06F 1/3206
  See application file for complete search history.

(56) References Cited

U.S. PATENT DOCUMENTS

| | | | |
|---|---|---|---|
| 10,381,942 B1* | 8/2019 | Owen | H02M 5/458 |
| 10,599,204 B1* | 3/2020 | Ross | G06F 11/3006 |
| 2011/0072289 A1* | 3/2011 | Kato | G06F 1/26 713/340 |
| 2013/0063280 A1* | 3/2013 | Pamulaparthy | H02J 3/26 340/658 |
| 2013/0218497 A1* | 8/2013 | Stanlake | H02J 3/26 702/65 |
| 2014/0018969 A1* | 1/2014 | Forbes, Jr. | H02J 3/322 700/295 |
| 2016/0313779 A1* | 10/2016 | Gupta | H02J 13/00001 |
| 2017/0139462 A1* | 5/2017 | Potlapally | G06F 11/3062 |
| 2017/0242469 A1* | 8/2017 | Harris | H02J 3/26 |

\* cited by examiner

*Primary Examiner* — Kim Huynh
*Assistant Examiner* — Cole Jiawei Wentzel
(74) *Attorney, Agent, or Firm* — Fishman Stewart PLLC

(57) ABSTRACT

A method for power distribution may include providing, via a power distribution unit, power to a plurality of computing devices, the computing devices including a respective processor and memory; monitoring electrical current consumption of the plurality of computing devices for a plurality of phases; determining if a difference between the electrical current consumption of a phase of the plurality of phases and the electrical current consumption of one or more other phases of the plurality of phases exceeds a threshold; and/or balancing the electrical current consumption of the plurality of phases, if the difference exceeds the threshold, such that the difference does not exceed the threshold.

20 Claims, 3 Drawing Sheets

POWER DISTRIBUTION SYSTEM AND METHOD

CROSS-REFERENCE TO RELATED APPLICATION

This application claims the benefit of and priority to U.S. Provisional Patent Application Ser. No. 63/185,714, filed on May 7, 2021, the disclosure of which is hereby incorporated by reference in its entirety as though fully set forth herein

TECHNICAL FIELD

The present disclosure generally relates power distributions systems and methods used in the field of computing and, more particularly, to power distributions systems and methods used for computing devices in a facility such as in a data center.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many large computing facilities (e.g., data centers) house large numbers of computing devices/computers such as general-purpose servers (e.g., for web hosting, email, etc.) or more specialized computing devices (e.g., cryptocurrency miners, high performance computers for data mining, artificial intelligence, machine learning, etc.). A large number of these computing devices (e.g., 100's, 1000's, 10000's, or more) can be housed in a single facility.

Managing power consumption of computing devices may be desirable to maximize efficiency, such as for monetary and/or environmental cost purposes.

For at least these reasons, there is a desire for solutions/options that minimize or eliminate one or more challenges or shortcomings of power distribution systems and methods. The foregoing discussion is intended only to illustrate examples of the present field and is not a disavowal of scope.

SUMMARY

In illustrative embodiments, a method for power distribution may include providing, via a power distribution unit, power to a plurality of computing devices, the computing devices including a respective processor and memory; monitoring electrical current consumption of the plurality of computing devices for a plurality of phases; determining if a difference between the electrical current consumption of a phase of the plurality of phases and the electrical current consumption of one or more other phases of the plurality of phases exceeds a threshold; and/or balancing the electrical current consumption of the plurality of phases, if the difference exceeds the threshold, such that the difference does not exceed the threshold.

In an example embodiment, a power distribution system may include a plurality of computing devices having a respective processor and memory; a power distribution unit, including: a power input for receiving power having a plurality of phases including a first phase, a second phase, and a third phase, a plurality of electrical outlets connected to the plurality of computing devices, and/or one or more current sensors configured to sense electrical current consumption by the computing devices for the first phase, the second phase, and the third phase. The power distribution unit may be configured to determine if the electrical current consumption is out of balance and/or to balance the electrical current consumption if the electrical current consumption is out of balance.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
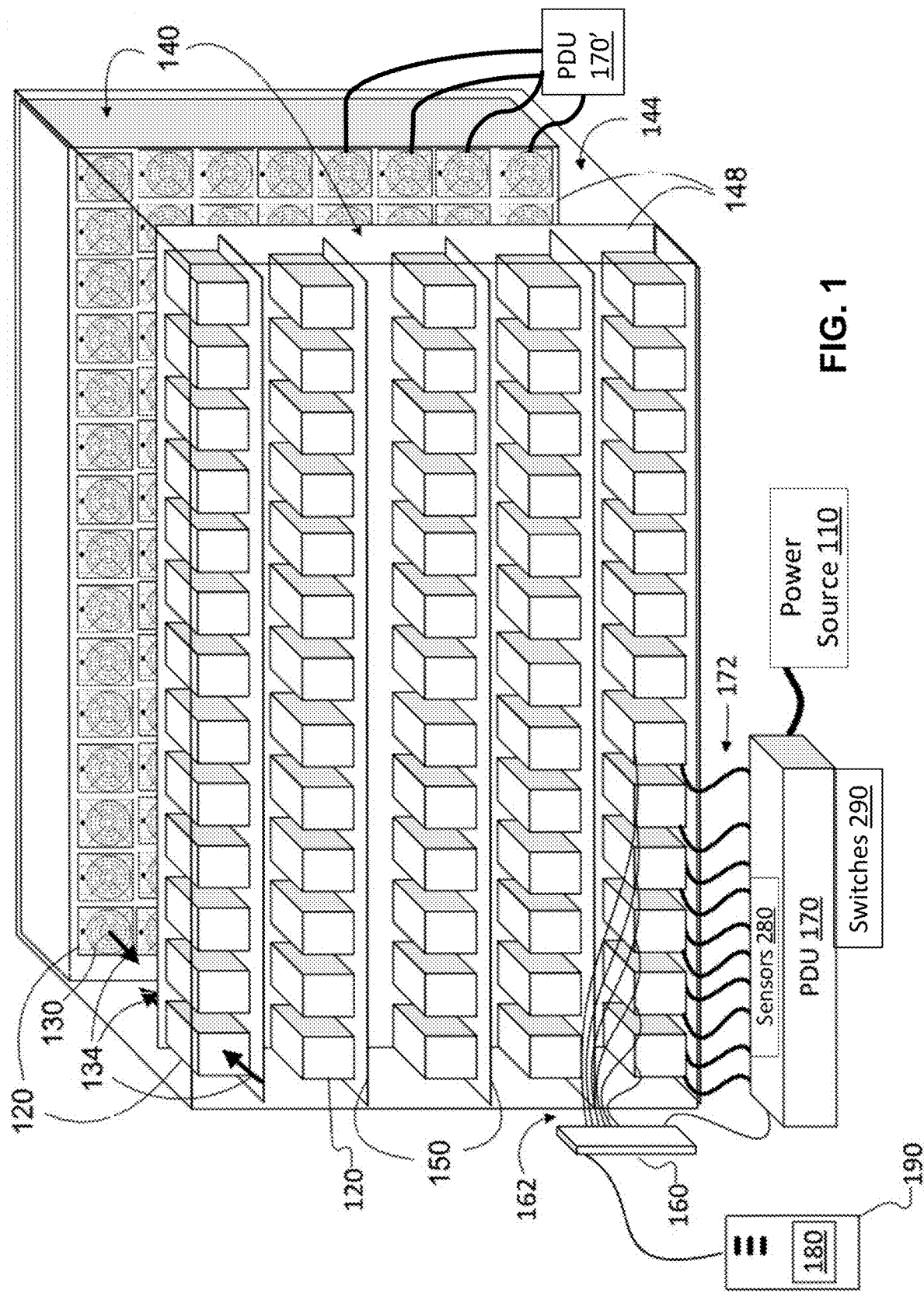
FIG. 1 is an illustration of one example embodiment of a power distribution system according to the teachings of the present disclosure.

Turning now to FIG. 1, an illustration of one example embodiment of a power distribution system 100, which may, for example be used is connection with managing network-enabled computing devices in a facility such as a data center, is shown. In this embodiment, a plurality of computing devices 120 (e.g., computing devices such as cryptocurrency miners, servers, Internet-of-Things (IoT) devices, network-enabled cameras, PCs, computing appliances, etc.) are positioned on a plurality of shelves 150 within racks 140. The computing devices 120 may be affixed to or placed on shelves 150 and may be oriented in the same direction to improve cooling as shown in the illustration. For example, computing devices 120 may have one or more fans 130 that are configured to draw in cool air from one side of the rack (often called a cold aisle) and exhaust hot air to the other side as shown by arrows 134. With all computing devices 120 exhausting hot air in the same direction, the hot exhaust air can be kept within the space 144 between the racks 140 (often called a hot aisle) and then exhausted in a controlled manner (e.g. via ceiling vents) to prevent the hot air from being drawn back into the computing devices 120, which could reduce cooling efficiency. Racks 140 may have air barriers 148 to prevent the hot air from escaping from the hot aisle back to the cold aisle.

In this example embodiment, the computing devices 120 may be connected to a network 162 (e.g., via Ethernet cables) via a network switch 160. Other types of network connections are possible and contemplated, for example, wireless or fiber optic network interconnections may also be used. Network switch 160 may be connected to an internal network, for example a local area network, and or an external network, e.g., the Internet. Computing devices 120 may be configured to receive work or tasks to be performed and output results via the network. Computing devices 120 may also be configured to receive control instructions via the network, for example instructions to reboot, power up, power down, hibernate, or enter low power or sleep mode. Computing devices 120 may also be configured to report status data via the network, for example either in a push mode where the computing device 120 is configured to periodically send status data, or in a pull mode where the computing device 120 responds to status inquiry instructions received via the network.

Computing devices 120 may receive work tasks and control instructions from a management computer 190. In this embodiment, management computer 190 may be connected to the same network 162 as computing devices 120, e.g., via a network switch 160. Management computer 190 may be configured to execute a management application 180 that may be configured to receive work items (e.g., from an external source) and distribute the work items amongst the computing devices 120. Management application 180 may also be configured to perform management functions such as tracking the power consumption of the computing devices 120 through the power distribution unit 170, such as for optimization, efficiency management, and/or billing purposes. Management application 180 may also be configured to assist users such as data center technicians in identifying the location of computing devices 120 within the facility.

In this example embodiment, computing devices 120 may be connected to power distribution unit 170 via one or more power cables 172. For example, in some embodiments, computing devices 120 may each have one power cable 172, but in other embodiments they may have two or more power cables 172 to receive power from the power distribution unit 170. For example, if the computing device 120 is a high-power cryptocurrency miner, it may have two or more power cables to provide additional and/or redundant power from the power distribution unit 170. Power distribution unit 170 may for example receive power from a transformer or directly from a power main or utility grid. Power distribution unit 170 may be controllable remotely (e.g., via ethernet, Wi-Fi, USB, Bluetooth, or other network protocol) and may be configured to receive instructions to power on or off a particular outlet or outlets 210, such as from and/or via management computer 190. The power distribution unit 170 may also be configured to report power usage data (e.g., current draw, voltage, power in watts, etc.) for its outlets 210. For example, power distribution unit 170 may be configured to respond to periodic power usage queries from management application 180.

Management computer 190 may, for example, include a personal computer (PC), a server (virtualized or physical), a specialized appliance, and/or a mobile device. Management computer 190 may be configured with one or more processors, volatile memory, and/or non-volatile memory such as flash storage or internal or external hard disk (e.g., network attached storage).

Management application 180 may be implemented in software (e.g., instructions stored on a non-volatile storage medium such as a hard disk, flash drive, or DVD-ROM), but hardware implementations are possible. Software implementations of management application 180 may be written in one or more programming languages or combinations thereof, including low-level or high-level languages, with non-limiting examples including Java, Ruby, JavaScript, Python, C, C++, C#, or Rust. The program code may execute entirely on the management computer 190, partly on the management computer 190 and partly on a user's computer or device, and/or partly on a remote computer or server, and/or management computer 190 may be entirely remote.

Figure 2:
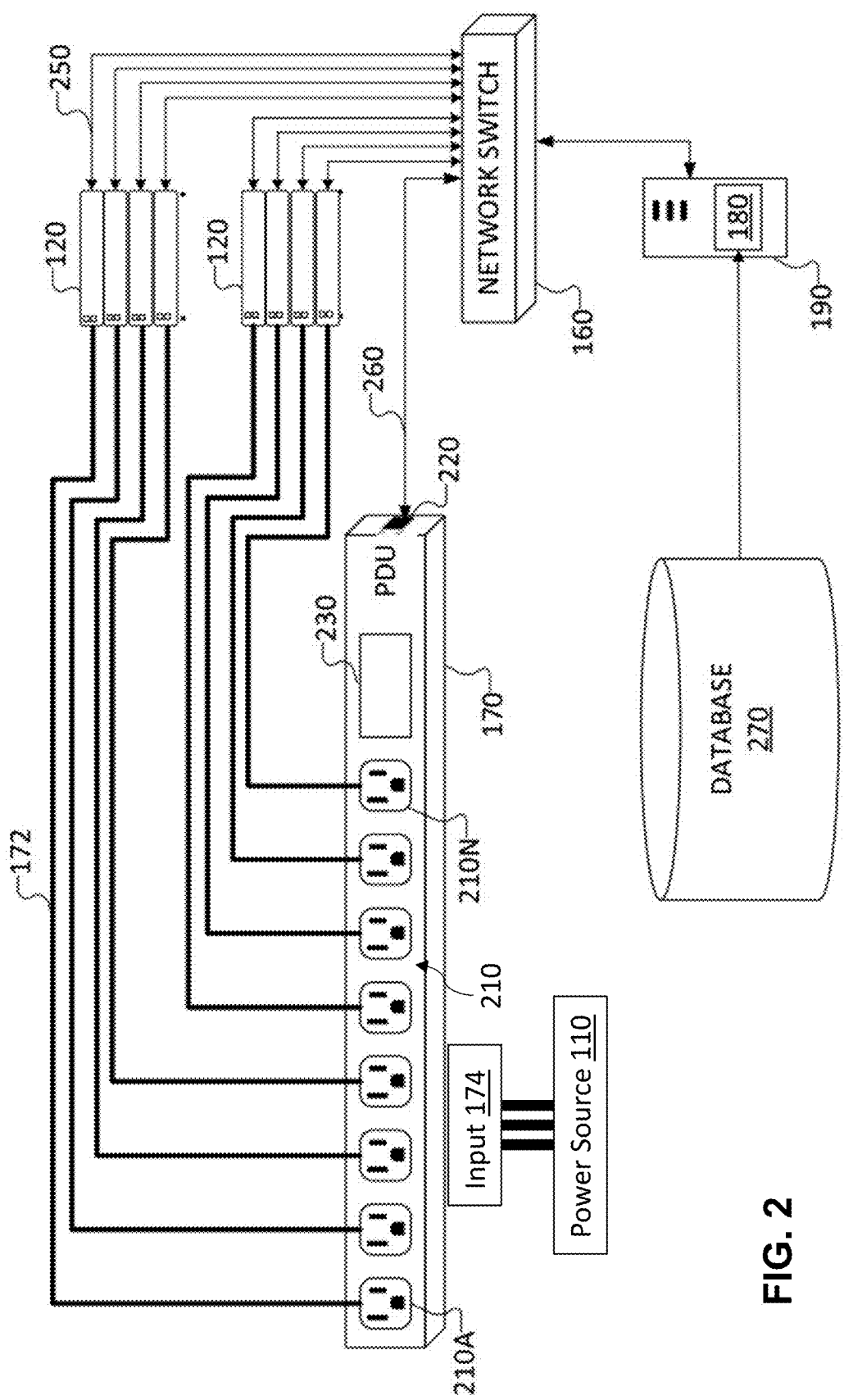
FIG. 2 is a diagram of one example embodiment of a power distribution system according to the teachings of the present disclosure.

Turning now to FIG. 2, an illustration of one example embodiment of a power distribution system 100 is shown. In this embodiment, power distribution unit (PDU) 170 has a plurality of outlets 210 (e.g., outlets 210A through 210N) that may provide power to computing devices 120 (in this example, computing devices such as servers and/or cryptocurrency miners in a data center) via power cables 172. Power distribution unit 170 may also have a PDU computer/controller 230 (e.g., an electronic controller) and a network interface 220 (e.g., connected to network switch via network connection 260). PDU computer/controller 230 may, for example, include a processor and/or a memory. Computing devices 120 may each be connected to a different outlet 210 of PDU 170. In some example configurations, each computing device 120 may be connected to two or more different outlets 210 of PDU 170, such as via two or more power cables 172.

In other example embodiments, power distribution unit 170 may bypass network switch 160 and be directly connected to management computer 190, such as via a USB or wireless network connection. The controller 230 may be configured to receive instructions from network interface 220 and power on or off selected outlets 210A-N. Controller 230 may also be configured to provide power/current draw/consumption information for one or more of outlets 210A-N (e.g., in response to power consumption queries received via network interface 220). The power consumption information (e.g., draw) may be provided, for example, in watts or in current (e.g., amps), and may be obtained via one or more sensors 280.

In the embodiment illustrated, computing devices 120 may be connected to network switch 160 via a set of network connections 250. Management computer 190 may also be connected to network switch 160. In this embodiment, management computer 190 may be configured to execute management application 180, which may communicate with database 270, and/or control one or more other components of system 100, such as to carry out, at least in part, one or more actions/methods disclosed herein. Database 270 may be configured to store power consumption information received by management application 180 or management computer 190, such as from power distribution unit 170. Management application 180 may also be configured to store mapping information such as location information regarding computing devices 120 in database 270. This stored information may, for example, be useful for billing and audit purposes.

With illustrative embodiments, PDU 170 may receive power from a power source 110, such as power grid, a transformer, a battery, and/or another PDU, among others. The power source 110 may be connected to an input 174 of PDU 170, which may be configured for receiving power having a plurality of phases. The power received by PDU 170 from power source 110 may, for example, include a plurality of phases, such as a first phase, a second phase, and/or a third phase (e.g., three-phase alternating current (AC) power). The PDU 170 may provide electrical power to one or more computing devices 120, such as via an output 176 that may include one or more outlets 210 (e.g., outlets 210A-210N) and/or via power cables 172. For example and without limitation, the PDU 170 may provide power/current of at least one phase to each outlet 210 and/or to each computing device 120.

It may be desirable to maintain the current consumption/draw of computing devices 120 relatively even across some or all of the plurality of phases. For example, a total power consumption may correspond to the maximum current/power consumed by any phase, so if the computing devices 120 are drawing 100 Amps on one phase, but only drawing 50 Amps on another phase or phases, the total power consumption may be determined according to the 100 Amps, which may effectively waste 50 Amps available for the other phase(s). Maintaining a balanced power/current consumption for each phase, which may include consumptions for the plurality of phases being within a threshold of each other, may allow for increased/maximized efficiency.

In example embodiments, one or both of PDU 170 and/or management computer 190 may be configured to monitor current/power consumption for one or a plurality of phases. For example, one or more electrical sensors 280 (e.g., current sensors, power meters, etc.) may be connected to and/or integrated with PDU 170 and/or management computer 190. Electrical sensor(s) 280 may be configured to sense information regarding electrical current/power consumption by computing devices 120 for a plurality of phases, such as the first phase, the second phase, and/or the third phase. PDU 170 and/or management computer 190 may monitor information from electrical sensor(s) 280 to determine electrical current/power consumption by computing devices 120 for a plurality of phases. Power distribution system 100 and/or power distribution unit 170 may, for example, include an electrical sensor 280 for each phase of received power.

With illustrative embodiments, PDU 170 and/or management computer 190 may be configured to the determine if current/power consumption for the plurality of phases is out of balance. Determining if current/power consumption is out of balance may include comparing consumption of each phase to consumption of the other phase(s) and/or determining if a difference in consumption between a phase and one or more other phases exceeds a threshold. The threshold, for example and without limitation, may correspond to an acceptable amount of difference of consumption between phases and may, at least in some instances, be a relatively small percentage, such as about 5% or less, among other values, and/or may be user-specified.

In example embodiments, system 100 may be configured for balancing electrical current consumption of a plurality of phases, such as if PDU 170 and/or management computer 190 determine that current consumption is out of balance. Balancing electrical current consumption may include one or more of a variety of actions. For example, balancing electrical current consumption may include PDU 170 and/or management computer 190 powering up and/or sending a power up instruction to an additional computing device 120 that is connected (e.g., newly or previously) to a phase for which consumption is more than the threshold below one or more other phases. In some circumstances, balancing electrical current consumption may include PDU 170 and/or management computer 190 sending a power down instruction to one or more computing devices 120 that are connected to a phase for which consumption is more than the threshold above one or more other phases, such as until consumption for the phase is no longer more than the threshold above the one or more other phases. For example, PDU 170 and/or management computer 190 may continue to send power down instructions to more computing devices 120 until consumption for the phases is balanced (e.g., within the threshold). In some circumstances, balancing the electrical current consumption may include operating PDU 170 (e.g., on its own and/or via management computer 190) to reduce current provided to one or more computing devices 120 that are connected to a phase for which consumption is more than the threshold above one or more other phases, such as until consumption for the phases is balanced. A power down instruction may for example be implemented to reduce the operating voltage or frequency of one or more of the computing devices 120 (or processors or ASICs therein), reduce the amount of work performed (e.g., by idling the device or its processors or ASICs), cause the device to enter a sleep or hibernate mode, or a full power down, or it may cause the PDU to disconnect power to one or more devices.

With example embodiments, system 100 may be configured to distribute power to, operate, and/or receive additional computing devices 120. For example, one or more additional computing devices 120 may be connected to PDU 170. PDU 170 may provide power to the one or more additional computing devices 120 and PDU 170 and/or management computer 190 may monitor the one or more additional computing devices 120 for a period of time (e.g., a testing/evaluation period). For example, PDU 170 and/or management computer 190 may monitor current consumption of the one or more additional computing devices 120 and determine if continued operation will result in unbalanced consumption (e.g., differences in consumption for the phases exceeding the threshold). If PDU 170 and/or management computer 190 determines that continued operation would result in unbalanced consumption, PDU 170 and/or management computer 190 may modify the power provided to the additional computing devices 120 or may modify the power provided or drawn by other computing devices 120. For example and without limitation, PDU 170 and/or management computer 190 may be configured to obtain an efficiency value for computing devices 120 (e.g., computations per unit of power, such as hash rate), and if the additional computing devices are more efficient than existing computing devices, PDU 170 and/or management computer 190 may reduce current provided to and/or drawn by the existing computing devices, which may include powering down existing computing devices. Balancing consumption and/or shifting power to more efficient computing devices 120 may improve the power efficiency of system 100.

In illustrative embodiments, balancing electrical current consumption may include disconnecting a computing device 120 from a first outlet 210 and connecting the computing device to a second outlet 210. For example, if the first outlet 210 is connected to a first phase for which consumption is more than the threshold above other phases, disconnecting the computing device 120 may reduce consumption for that phase, and connecting the computing device 120 to another phase may increase consumption for that other phase, which may further reduce a consumption difference between the phase and the other phase. In some examples, disconnection/reconnection may be conducted automatically. For example, if a computing device 120 is connected to more than one outlet 210, PDU 170 and/or management computer 190 may control one or more electrical switches 290 to shift consumption from the first outlet connected to a first phase to the second outlet connected to a second phase. The one or more electrical switches 290 (e.g., contactors, relays, transistors, solid-state switches, etc.) may be disposed in and/or connected to PDU 170 and/or computing devices 120. In some other examples, disconnection/reconnection may be conducted, at least in part, manually/mechanically. For example, a power cable 172 of a computing device 120 may be physically removed from a first outlet and inserted into a second outlet (e.g., by a user/technician, by a machine, by a robot, etc.).

With example embodiments, a power distribution system 100 may include one or more additional PDUs 170' (see FIG. 1) that may be connected to respective sets of computing devices 120. PDU(s) 170' may include substantially the same configuration as PDU 170. In some example configurations, power distribution unit(s) 170' may be configured to balance current consumption for the respective sets of computing devices 120 for the plurality of phases. In some example configurations, a management application 180 and/or a management computer 190 may be configured to control, at least in part, operation of PDU 170 and/or PDU(s) 170', such as to balance current consumption of a plurality of computing devices 120, which may include respective sets of computing devices connected to PDUs 170, 170'. For example, a management computer 190 may be configured to balance current consumption for computing devices 120 connected to a plurality of PDUs 170, 170' (e.g., for multiple racks, one or more pods, one or more aisles, portions of a facility, and/or an entire facility).

In example embodiments, balancing current consumption for computing devices 120 connected to a plurality of PDUs 170, 170' may include determining a first balanced configuration and/or a second balanced configuration. A first balanced configuration (e.g., a locally balanced configuration) may include management computer 190 controlling (e.g., provide instructions to), at least in part, PDUs 170, 170' to balance each power distribution unit 170, 170', which may include each set of computing devices 120 consuming phase-balanced current. A second balanced configuration (e.g., a globally balanced configuration) may include management computer 190 controlling, at least in part, PDUs 170, 170' such that a total/combined current consumption for multiples sets of computing devices 120 connected to multiple PDUs 170, 170' is balanced. With such a configuration, individual PDUs 170, 170' and/or the sets of computing devices 120 connected thereto may not be phase-balanced. For example and without limitation, a second balanced configuration may include PDU 170 and/or a first set of computing devices 120 connected thereto consuming significantly more current of a first phase than second and third phases while another PDU 170' and/or a second set of computing devices 120 connected thereto consumes significantly less current of the first phase than the second and third phases such that the total consumption of each phase (e.g., for all computing devices 120 connected to the power distribution units 170, 170' that are in communication with management computer 190) is within a threshold of each other phase. In some example embodiments, management computer 190 may provide a recommendation of a PDU 170, 170' (and/or an outlet/phase thereof) to which the next new computing device 120 should be connected to maintain and/or improve balancing.

Figure 3:
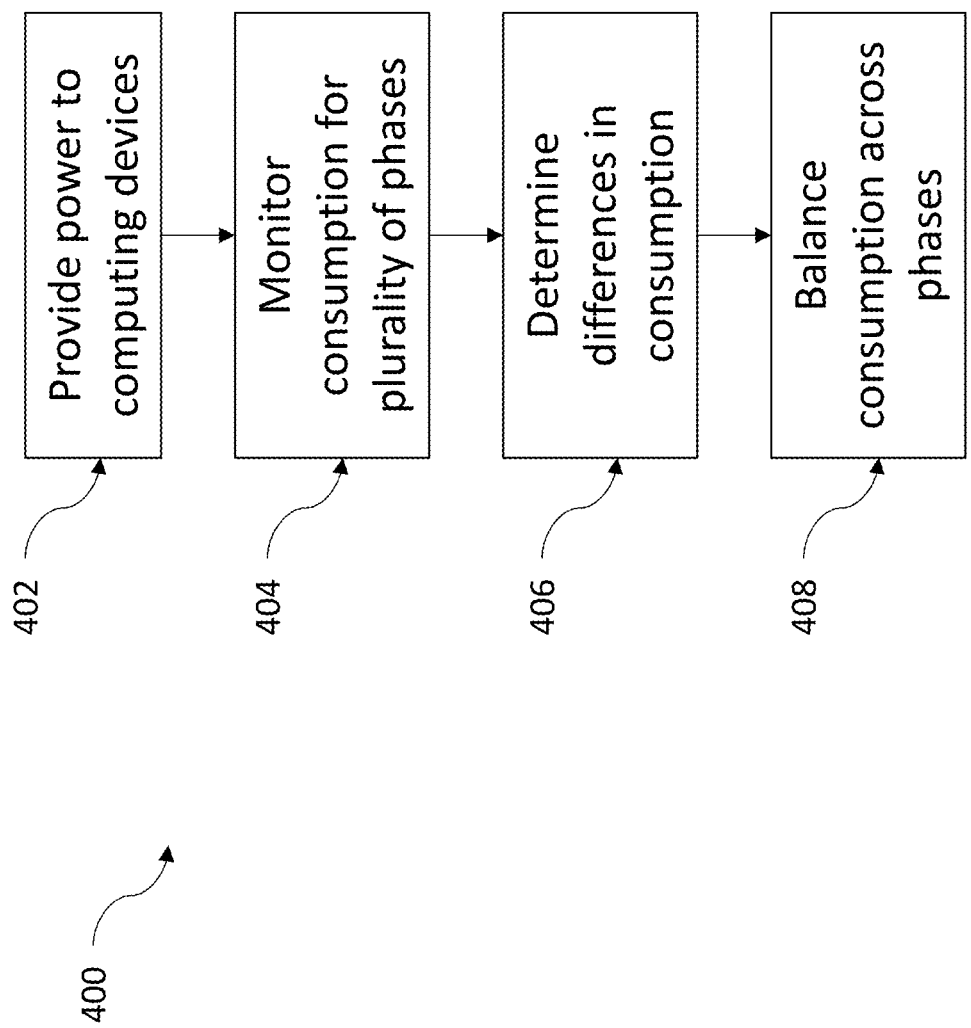
FIG. 3 is a flowchart of one example embodiment of a method of power distribution according to the teachings of the present disclosure.

Turning now to FIG. 3, a flowchart of one example embodiment of a method 400 of power distribution is shown. Method 400 may include providing power to a plurality of computing devices 120 (block 402), such as via outlets 210, which may be connected to a plurality of phases, of PDU 170. Method 400 may include monitoring current/power consumption of computing devices 120 for each of the plurality of phases (block 404), such as via one or more sensors 280. Method 400 may include determining differences in consumption across the plurality of phases (block 406), which may include determining if the difference in consumption for one phase relative to one or more other phases exceeds a threshold (e.g., if the phases are unbalanced). Method 400 may include, if the phases are unbalanced, balancing consumption across the plurality of phases (block 408). Balancing consumption may include one or more of reducing power provided to certain computing devices, disconnecting certain computing devices, reconnecting certain computing devices, and/or connecting additional computing devices, among other actions. In some instances current consumption may change over time, such as if computing devices 120 begin to fail or if previously inactive computing devices 120 or portions thereof become active (e.g., are repaired, reset themselves, reactivate themselves, etc.). System 100 may be configured to rebalance current consumption as current consumption changes.

In examples, a computer/computing device (e.g., computing devices/computers 120), may include an electronic controller and/or include an electronic processor, such as a programmable microprocessor and/or microcontroller. In embodiments, a computer/computing device may include, for example, an application specific integrated circuit (ASIC). A computer/computing device may include a central processing unit (CPU), a memory (e.g., a non-transitory computer-readable storage medium), and/or an input/output (I/O) interface. A computer/computing device may be configured to perform various functions, including those described in greater detail herein, with appropriate programming instructions and/or code embodied in software, hardware, and/or other medium. In embodiments, a computer/computing device may include a plurality of computers and/or controllers. In embodiments, a computer/computing device may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or nonfunctional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for electrical power distribution, the method comprising:
   providing, via a power distribution unit, power to a plurality of computing devices, the computing devices including a respective processor and memory;
   monitoring electrical current consumption of the plurality of computing devices for a plurality of phases;
   comparing, during ongoing operation, the electrical current consumption of each phase to the electrical current consumption of the other phases to detect a difference in the electrical current consumption among any of the plurality of phases;
   detecting the difference exceeds a threshold; and
   balancing the electrical current consumption of the plurality of phases, in response to detecting that the difference exceeds the threshold, such that the difference does not exceed the threshold, wherein balancing the electrical current consumption is according to an efficiency value for each computing device, the efficiency value representing computations per unit of power for the computing device, and wherein the balancing further includes reducing current provided to less efficient computing devices;
   wherein the threshold corresponds to an acceptable amount of difference of consumption between phases, the acceptable amount being user-specified or a percentage based difference;
   wherein the threshold is selected to maintain current consumption across the plurality of phases within a predefined range to optimize power delivery efficiency.

2. The method of claim 1, wherein balancing the electrical current consumption of the plurality of phases includes powering up one or more additional computing devices connected to the phase.

3. The method of claim 1, wherein balancing the electrical current consumption of the plurality of phases includes sending a power down instruction to one or more computing devices of the plurality of computing devices that are connected to the phase.

4. The method of claim 1, wherein balancing the electrical current consumption of the phase includes operating the power distribution unit to reduce current provided to one or more computing devices of the plurality of computing devices that are connected to the phase.

5. The method of claim 1, wherein reducing electrical current consumption of the phase includes operating the power distribution unit to stop providing power to one or more computing devices of the plurality of computing devices that are connected to the phase.

6. The method of claim 1, wherein balancing the electrical current consumption includes implementing a local balancing configuration in which each power distribution unit individually balances current across its associated phases, or implementing a global balancing configuration in which current consumption across multiple power distribution units is collectively balanced to maintain aggregate phase balance, even if individual power distribution units remain unbalanced.

7. The method of claim 1, including connecting an additional computing device to the power distribution unit and providing power to the additional computing device and monitoring electrical current consumption for a period of time.

8. The method of claim 7, determining if operating the additional computing device will result in the difference exceeding the threshold.

9. The method of claim 1, wherein the power distribution unit includes a plurality of outlets; and
each computing device of the plurality of computing devices is connected to a different outlet of the plurality of outlets.

10. The method of claim 9, wherein each computing device is connected to two different outlets of the plurality of outlets.

11. The method of claim 1, wherein balancing the electrical current consumption includes powering down at least one computing device consuming power of the phase.

12. The method of claim 1, wherein balancing the electrical current consumption includes increasing the power consumption of other phases of the plurality of phases.

13. The method of claim 12, wherein increasing the power consumption of other phases includes connecting at least one additional computing device to one or more of the other phases.

14. The method of claim 12, wherein balancing the electrical current consumption includes disconnecting a computing device of the plurality of computing devices from a first outlet of a plurality of outlets of the power distribution unit and connecting the computing device to a second outlet of the plurality of outlets.

15. A non-transitory, computer-readable storage medium storing instructions executable by a processor of a computational device, which when executed cause the computational device to execute the method of claim 1.

16. A power distribution system, comprising:
a plurality of computing devices having a respective processor and memory;
a power distribution unit, including:
a power input for receiving power having a plurality of phases including a first phase, a second phase, and a third phase;
a plurality of electrical outlets connected to the plurality of computing devices; and
one or more current sensors configured to sense electrical current consumption by the computing devices for the first phase, the second phase, and the third phase; and
a management computer in communication with the power distribution unit;
comparing, during ongoing operation, the electrical current consumption of each phase to the electrical current consumption of the other phases to detect a difference in the electrical current consumption among any of the plurality of phases;
the electrical current consumption of each phase to the electrical current consumption of the other phases to detect a difference in the electrical current consumption among any of the plurality of phases;
determining if the difference exceeds a threshold; and
balancing the electrical current consumption of the plurality of phases, in response to determining that the difference exceeds the threshold, such that the difference does not exceed the threshold, wherein balancing the electrical current consumption includes is according to an efficiency value for each computing device, the efficiency value representing computations per unit of power for the computing device, and wherein the balancing further includes reducing current provided to less efficient computing devices or shifting power to more efficient computing devices;
wherein the threshold corresponds to an acceptable amount of difference of consumption between phases, the acceptable amount being user-specified or a percentage based difference;
wherein the threshold is selected to maintain current consumption across the plurality of phases within a predefined range to optimize power delivery efficiency.

17. The power distribution system of claim 16, wherein the management computer is configured to control, at least in part, the power distribution unit to balance the electrical current consumption.

18. The power distribution system of claim 17, including one or more additional power distribution units each connected to provide power to a respective set of computing devices of the plurality of computing devices;
wherein the management computer is configured to control the power distribution unit and the one or more the additional power units to balance the electrical current consumption for the plurality of phases.

19. The power distribution system of claim 17, wherein a first balanced configuration includes the power distribution unit and the one or more additional power distribution units each being balanced; and
a second balanced configuration includes the power distribution unit being unbalanced and at least one of the one or more additional power distribution units being unbalanced such that a combination of the power distribution unit and the at least one additional power distribution unit is balanced.

20. The method of claim 1 wherein the balancing further includes at least one of:
i.) sending a power down instruction to one or more computing devices connected to a phase consuming more than the threshold above one or more other phases;
ii) powering up one or more additional computing devices connected to a phase consuming less than the threshold below one or more other phases;
iii) reducing operating voltage or frequency of one or more computing devices connected to a phase consuming more than the threshold above one or more other phases; and
iv) connecting an additional computing device to the power distribution unit, monitoring its current consumption, and determining if its operation balances the plurality of phases.

* * * * *